Patented June 22, 1948

2,444,005

UNITED STATES PATENT OFFICE 2,444,005

PREPARATION OF PTERINS

Donna Bernice Cosulich, Bound Brook, N. J., assignor to American Cyanamid Company, New York, N. Y., a corporation of Maine No Drawing. Application December 31, 1946, Serial No. 719,613

7 Claims. (Cl. 260—250)

This invention relates to a new process of preparing pterins.

The new process of the present invention may be illustrated by means of the following equation:

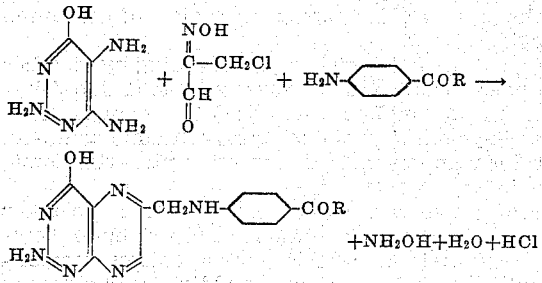

In the formulae R represents a radical such as —OH, —OR', or —NHR'', R' being an alkyl radical and R'' being an aliphatic radical.

Pterins are compounds having a fused pyrimido pyrazyl nucleus. The particular pterins that may be prepared by the process described and claimed herein include pteroylglutamic acid, a compound more commonly known as folic acid, which has proven to be of very considerable importance in the treatment of diseases of the blood. Other related pterins which may be prepared by the process possess vitamin like properties and may be used in medicine and as growth stimulating factors in animal feeds and the like. Still other related pterins possess anti-vitamin like properties and are useful because of this fact.

Of the three intermediates employed in the process, 2,4,5-triamino-6-hydroxy pyrimidine is an old compound which may be prepared by methods that have been described in the chemical literature. The compound may be used directly in the reaction in the form illustrated or in the form of one of its acid salts such as the dihydrochloride or sulphate. Tautomeric forms of the intermediate, which are believed to exist, may also be employed.

The second intermediate, 3-chloro-2-isonitrosopropionaldehyde may be new. It appears to be an unstable substance, however, and I prefer to prepare it just prior to use by the reaction of nitrosylchloride on acrolein. I may, of course, employ the corresponding bromo derivative, 3-bromo-2-isonitrosopropionaldehyde, which may be prepared by the reaction of nitrosylbromide on acrolein. The preparation of a 3-halo-2-isonitrosopropionaldehyde is illustrated hereinafter, the nitrosylchloride being developed in situ from amyl nitrite and hydrochloric acid. Of course, any other compounds reacting to form nitrosylchloride or nitrosylbromide could be employed in this process.

The third intermediate is an aminobenzoyl derivative, including aminobenzoic acid and the esters and amides of this acid. I may, of course, use the salts of the acid as well. Actually, as will be seen from the reaction, the functional group is the amino radical on the benzene ring, the exact nature of the other substituents not being critical to the process. When using esters of aminobenzoic acid I prefer the more easily prepared alkyl esters, in which case R' is an alkyl radical such as methyl, ethyl, butyl or the like.

Preferred compounds are obtained, however, when the group R in the general formula is the radical —NHR'' in which R'' is an aliphatic radical. In such case the intermediate is an amide of aminobenzoic acid. The preferred amides are those of amino acids in which the group R'' is the radical of an amino acid, the nitrogen atom being of the amino acid. In such case typical intermediates would be p-aminobenzoylglutamic acid, p-aminobenzoylasparate, p-aminobenzoylacid, p-aminobenzoylalanine, and many others including those having a peptide linkage such as p - aminobenzoyldiglutamylglutamic acid. Of course, the acidic group of the amino acid can be esterified or neutralized with salt forming groups if desired.

The reaction will take place over a fairly wide range of temperatures and hydrogen ion concentrations. The temperatures may range from 2° or 3° C. up to about the boiling point of the aqueous suspension of the reaction mixture, preferably 30° to 50° C. Best results appear to be obtained at a pH within the range 3 to 5, but a wider range from about pH 1 to pH 7 is permissible.

The reaction is usually conducted with the intermediates suspended or dissolved in a solvent such as water or an inert liquid such as ethanol, benzene, or the like. Inasmuch as the solvent does not take part in the reaction, its choice is not of critical importance.

To illustrate the invention with particular details, the following example is given. 2.8 grams of cool acrolein was added slowly with cooling to a cool mixture of 11.7 grams of amyl nitrite and 10 cc. of hydrochloric acid. The solution, which contained 3-chloro-2-isonitrosopropionaldehyde, was added slowly to a solution of 10.7 grams of 2,4,5-triamino-6-hydroxy pyrimidine dihydrochloride and 14 grams of p-aminobenzoylglutamic acid in 350 cc. of water at 43° C. at a pH between 3 and 4. During the addition the pH was maintained within the range 3 to 4 by the occasional addition of sodium hydroxide solution as required. The solid product which was obtained was separated by filtration. It was then washed in water, alcohol, and acetone and dried. Biological assay of the crude product proved it to contain a substantial amount of pteroylglutamic acid.

Although the crude material is useful as an adjunct to animal feeds, it may be purified for pharmaceutical use by the process described and claimed in the copending application of Brian L. Hutchings, Serial No. 669,099, filed May 11, 1946. Other suitable methods of purification will occur to those skilled in the art.

I claim:

1. A method which comprises bringing together under reactive conditions 2,4,5-triamino-6-hydroxy pyrimidine, a 3-halo-2-isonitrosopropionaldehyde, and a member of the group consisting of aminobenzoic acid and its salts, esters, and amides, and after reaction thereof recovering a substance having the formula

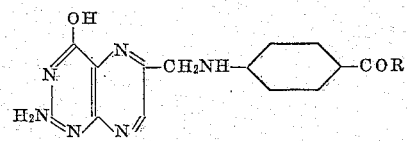

in which R is a radical of the group consisting of —OH, —OR′ and —NHR″, R′ being an alkyl radical and R″ being an aliphatic radical.

2. A method which comprises bringing together under reactive conditions 2,4,5-triamino-6-hydroxy pyrimidine, 3-bromo-2-isonitrosopropionaldehyde, and an amide of p-aminobenzoic acid, and after reaction thereof recovering a substance having the formula

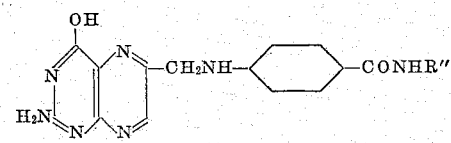

R″ being an aliphatic radical.

3. A method which comprises bringing together under reactive conditions 2,4,5-triamino-6-hydroxy pyrimidine, 3-chloro-2-isonitrosopropionaldehyde, and an amide of p-aminobenzoic acid, and after reaction thereof recovering a substance having the formula

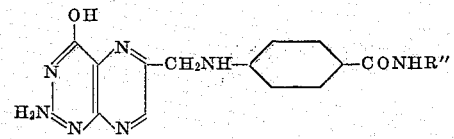

R″ being an aliphatic radical.

4. A method which comprises bringing together at a pH within the range 3 to 5 and a temperature of from 30° to 50° C. 2,4,5-triamino-6-hydroxy pyrimidine, 3 - chloro - 2 - isonitrosopropionaldehyde, and an amino acid amide of p-aminobenzoic acid, and after reaction thereof recovering a substance having the formula

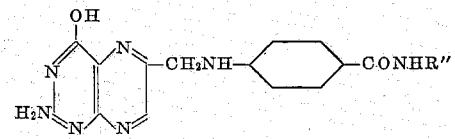

the group —NHR″ being the radical of the amino acid.

5. A method which comprises bringing together under reactive conditions 2,4,5-triamino-6-hydroxy pyrimidine 3-chloro-2-isonitrosopropionaldehyde, and p-aminobenzoylglutamic acid, and after reaction thereof recovering pteroylglutamic acid.

6. A method which comprises bringing together under reactive conditions 2,4,5-triamino-6-hydroxy pyrimidine, 3-chloro-2-isonitrosopropionaldehyde, and p-aminobenzoyldiglutamylglutamic acid, and after reaction thereof recovering pteroyldiglutamylglutamic acid.

7. A method which comprises bringing together under reactive conditions 2,4,5-triamino-6-hydroxy pyrimidine, 3-bromo-2-isonitrosopropionaldehyde, and p-aminobenzoylglutamic acid, and after reaction thereof recovering pteroylglutamic acid.

DONNA BERNICE COSULICH.